United States Patent [19]

Sinka et al.

[11] Patent Number: 4,780,500

[45] Date of Patent: Oct. 25, 1988

[54] WATER RETENTION AIDS

[75] Inventors: Joseph V. Sinka, Mendham; Dinshaw F. Bardoliwalla, Randolph; José L. Villa, Bridgewater; Edwin L. Kelley, Succasunna; Albert L. Resnick, Edison, all of N.J.

[73] Assignee: Henkel Corporation, Ambler, Pa.

[21] Appl. No.: 39,223

[22] Filed: Apr. 17, 1987

[51] Int. Cl.$^4$ .................... C08F 222/02; C08K 13/02; C08L 31/06
[52] U.S. Cl. ................................ 524/559; 526/318.2
[58] Field of Search ...................... 524/559; 526/318.2

[56] References Cited

U.S. PATENT DOCUMENTS

| | | | |
|---|---|---|---|
| 4,016,124 | 4/1977 | Crisp | 524/443 |
| 4,143,018 | 3/1979 | Crisp | 524/559 |
| 4,167,502 | 9/1979 | Lewis | 526/318.2 |
| 4,425,452 | 1/1984 | Nakata et al. | 524/47 |

OTHER PUBLICATIONS

Paper Coating Additives—Landes et al., (TAPPI Press—1978), pp. 74, 75 and 78.
Encyclopedia of Chemical Technology, Kirk-Othmer, (Third Edition, 1981), vol. 16, p. 822.
Paper Coating Additives Description of Functional Properties and List of Available Products and Suppliers, CA Report No. 48 (Mar. 1973—Technical Association of the Pulp and Paper Industry), pp. 23 and 24.

Primary Examiner—Paul R. Michl
Assistant Examiner—Mark R. Buscher
Attorney, Agent, or Firm—Ernest G. Szoke; Henry E. Millson, Jr.; Neal T. Levin

[57] ABSTRACT

Copolymers of (1) from about 80% to about 98% by weight of acrylic acid and (2) from about 2% to about 20% by weight of itaconic acid and having a weight average molecular weight of between about 100,000 to about 800,000 and which are at least water dispersible are useful as retention aids for paper coating compositions.

8 Claims, No Drawings

WATER RETENTION AIDS

BACKGROUND OF THE INVENTION

1. Field of the Invention

This invention relates to water retention aids useful in paper coating compositions.

2. Description of the Prior Art

Paper coating compositions, also known as coating colors, are applied to paper to improve certain of its properties such as brightness, smoothness, gloss, ink receptivity and the like. They are applied to the paper as water suspensions. Consequently, one of the concerns regarding use of the coating compositions is water retention, i.e., the ability to retain the water in the coating after application to the paper thereby reducing its migration to the paper. Subsequently, the water is removed from the coated paper by drying. In order to control release of the water, various water soluble polymers are added to the coating composition. They are known as water retention aids. See, for example, U.S. Pat. No. 4,425,452 —Nakata et al, Jan. 10, 1984, which points out that coating colors may contain auxiliary components such as water retention aids.

Examples of water retention aids are carboxy methyl cellulose, sodium alginate and synthetic polymers such as alkali swellable acrylate latex and polyacrylic acid. The carboxy methyl cellulose and sodium alginate are powders requiring dissolution in water before use. Aside from this additional preparation step, risk is run that undissolved particles remain in the paper coating composition which will mar the coating finish. In the case of alkali swellable acrylate latex, it is necessary to introduce ammonia or sodium hydroxide to put it in solution. Aside from this added step, handling ammonia and sodium hydroxide is disadvantageous. Regarding polyacrylic acid and alkali swellable acrylate latex, they have been found to increase the viscosity of the paper coating excessively.

SUMMARY OF THE INVENTION

Particular copolymers of acrylic acid and itaconic acid which are at least water dispersible have been found to be outstanding water retention aids for paper coating compositions.

One or a mixture of these copolymers is added to paper coating formulations which are then used in the conventional manner.

By use of these particular copolymers, water retention aids can be supplied in solution in high concentration and in easily pourable form for direct addition to the other components in the preparation of the coating composition. Further, it has been found that as use level is increased, these copolymers generally do not increase the viscosity of the coating composition as much as polyacrylic acid and alkali swellable acrylate latex. This allows for enhanced water retention by the coating composition before its limiting viscosity is reached.

DESCRIPTION OF THE PREFERRED EMBODIMENTS

The Copolymers

The copolymers are copolymers of (1) from about 80% to about 98% by weight of acrylic acid and (2) from about 2% to about 20% by weight of itaconic acid and are at least water dispersible, i.e., water dispersible or water soluble. They have a weight average molecular weight of between about 100,000 to about 800,000. The preferred weight average molecular weight is between about 250,000 to about 400,000. They can be used in the free acid form or in the form of any partially or completely neutralized salt or quaternary salt form so long as they are at least water dispersible. Examples are the sodium, potassium and ammonium salts. Mixed salts such as the sodium, ammonium salt can also be used.

The copolymers can be prepared from their respective monomers by conventional polymerization procedures, viz., solution, emulsion or bulk polymerization in the presence of conventional free radical initiators. Such procedures are well documented in the literature and do not form a part of this invention.

Examples of copolymers are (per cents are weight per cents):

- sodium salt of the copolymer of acrylic acid (95%) and itaconic acid (5%)
- potassium salt of the copolymer of acrylic acid (95%) and itaconic acid (5%)
- potassium salt of the copolymer of acrylic acid (90%) and itaconic acid (10%)
- copolymer of sodium acrylate (95%) and diammonium itaconate (5%)
- free acid of the copolymer of acrylic acid (80%) and itaconic acid (20%)
- ammonium salt of the copolymer of acrylic acid (90%) and itaconic acid (10%)

The copolymers are equally used in the form of aqueous solutions containing from about 10% by weight to about 30% by weight of solids. They are present in the coating composition in an amount sufficient to retard release of water from the coating composition without adversely affecting viscosity of the coating composition. Generally the copolymers are present in the coating formulation in an amount of from about 0.05% by weight to about 0.80% by weight as solids based upon the total solids content of the coating composition. Preferably, there is from about 0.10% by weight to about 0.50% by weight of polymer as solids based upon the total solids content of the coating composition.

The Coating Composition

Coating compositions and their application to paper and paperboard are well known. Further, the presence of the copolymers described herein does not adversely affect the properties of the coated paper or paperboard.

The coating compositions contain retention aids, pigment, binder (adhesive), lubricant and optionally, dispersant, defoamer and insolubilizer, all in an aqueous system. Typical pigments are clay (Kaolin), calcium carbonate, satin white, talc, titanium dioxide, zinc oxide and blanc fixe, while typical binders are starch, such as ethylated and oxidized starch, protein such as soya protein and casein, and synthetic resins such as carboxylated butadiene styrene latex such as a 60/40 carboxylated styrene/butadiene copolymer, polyvinyl acetate and polyvinyl acetateacrylic copolymer.

Useful lubricants include calcium stearate, waxes and fatty acid esters.

Examples of insolubilizer are melamine-formaldehyde resin and glyoxal-urea reaction product.

When using starch, it is generally cooked in water, then added to a dispersion of the pigment. Thereafter, lubricant is introduced. Based on 100 parts by weight pigment, there is used from about 10 to about 25 parts by weight binder solids, from about 0.5 to about 1.5 parts by weight of lubricant solids and from about 0.10 to about 0.50 parts by weight of retention aid. Optionally, there can be used from about 0.4 to about 2.5 parts by weight of insolubilizer.

The retention aid is introduced as a liquid at virtually any stage of the coating preparation.

The solids content of the coating composition can vary from about 30% by weight to about 70% by weight, the remainder being water.

The coating compositions containing the retention aid are applied to paper and paperboard by conventional methods which include the steps of applying the coating compositions to the paper or the paperboard, smoothing, drying and calendering or supercalendaring.

Test Methods

Efficacy of a retention aid is determined by measuring the time it takes the water in a coating composition to penetrate a paper sheet. The test method is described as follows. In brief, a stainless steel bottom late containing one or more test cells is provided. The bottom plate is insulated by a gasket from each cell. A test sheet is inserted between the cell and the bottom plate. The coating formulation is then poured in the cell and simultaneously a timer is automatically started. The circuitry of the device provides for automatically shutting off the timer when current passes through the test cell as a result of water from the coating composition in the test cell penetrating the sheet. That is, when water from the coating formulation reaches the other side of the paper, the current shorts out the timer. The time, in seconds, is read off of a timer. The longer the time, the more effective is the retention aid. Usually, the average for four or five cells is reported. During operation, the cells and coatings are at 110 deg. F (44 deg. C.) or other temperature such as 77 deg. F. The test sheet is S.D. Warren test paper (uncoated). Thus, conductivity of the coating is used to activate and deactivate a timer in order to measure how long it takes for the liquid portion of the coating to penetrate the paper.

A description for measuring efficacy of water retention aids by the foregoing is found in TAPPI, Volume 53, No. 2, pages 216-220 (February 1970)—J. F. Hern.

Brookfield viscosity

Viscosities of the various coating colors were measured using a Brookfield Digital Viscometer Model RVTD. Data were gathered at 10, 20, 50 and 100 rpm, usually using Spindle No. 5. Values are reported in centipoise. Usually measurements were carried out at 110 deg. F. (44 deg. C.).

For a fuller understanding of this invention, reference may be made to the following examples. These examples are given merely to illustrate the invention and are not to be construed in a limiting sense.

Examples I and II set forth two preparations for the copolymers. Where variations of these polymers are evaluated, the differences are shown in the tables.

EXAMPLE I

Preparation of Acrylic Acid—Itaconic Acid Copolymer (95/5 Weight %) via Bulk Polymerization 61.5 parts by weight of glacial acrylic acid was mixed with 10.5 parts by weight of 31% by weight sodium itaconate solution. The solution was partially neutralized with 3 parts by weight soda ash and then polymerized adiabatically using ammonium persulfate (0.45 parts by weight)/sodium metabisulfite (0.45 parts by weight)/sodium thiosulfate (0.8 parts by weight) as redox catalyst. At the end of the polymerization, the product was dried and ground (20 mesh) for evaluation. The copolymer was a partially sodium neutralized salt.

The weight average molecular weight of this copolymer is about 280,000.

EXAMPLE II

Preparation of Acrylic Acid—Itaconic Acid Copolymer (95/5 Weight %) via Solution Polymerization Into a one liter reaction flask fitted with stirrer, thermometer, condenser, nitrogen inlet and addition port was added 454.7 grams of de-ionized water followed by 187.2 grams of glacial acrylic acid. After blending well, there was added a solution of 0.37 gram of sodium hypophosphite dissolved in 14.5 grams of de-ionized water and the mixture stirred. To the stirred mixture, 208.4 grams of 50% sodium hydroxide was added slowly with good stirring and in a stream of nitrogen. The solution was maintained at 45-48 deg. C. during the caustic addition by using a cooling bath. The final pH of the resulting sodium acrylate was adjusted to 8.0-8.4.

Separately, a 36.3% solution of diammonium itaconate was prepared by neutralizing 108.9 grams of itaconic acid with 40.9 grams of ammonium hydroxide (28% ammonia) dissolved in 22.7 grams of de-ionized water. 39.5 grams of this solution was then dissolved in 94.2 grams of de-ionized water containing 1.0 gram of sodium persulfate and the entire solution placed in a metering pump connected to the one liter reaction flask by Tygon tubing. The contents of the flask were heated to 75 deg. C. under a stream of nitrogen and the diammonium itaconate, persulfate solution metered in over a period of about two hours. A temperature of 75 deg. C. was maintained along with a nitrogen atmosphere during addition. After addition of the diammonium itaconate, persulfate solution, a temperature of 75 deg. C. was maintained for an additional hour, after which the flask was cooled to about 50 deg. C. 285.7 grams of water was then added and the flask cooled to room temperature.

The resulting product was a 20% by weight solution of the copolymer of 95% by weight sodium acrylate and 5% by weight diammonium itaconate. pH was 7.5-8. Viscosity was 1600-1900 cps determined with a Brookfield Viscometer, Spindle No. 3 at 30 rpm at 25 deg. C. Weight average molecular weight was 350,000.

EXAMPLE III

The following base paper coating formulation was prepared.

| Ingredients | Weight % |
| --- | --- |
| Clay (No. 2) | 44.86 |
| Calcium carbonate (aqueous slurry of 77% by wt. solids) | 14.95 |
| Carboxylated styrene-butadiene latex (aqueous solution of 50% by wt. solids) - Dow 638A | 26.91 |
| Calcium stearate (aqueous dispersion of 48% by wt. solids) | 0.30 |
| Sodium polyacrylate dispersant mol. wt. 4,000-5,000 (aqueous solution of 43% by wt. solids) | 0.06 |
| Water | 12.92 |
| Total | 100.00 |

The formulation was prepared in the following manner.

The dispersant was first added to the water. Next, all of the clay was added to the water under mechanical agitation to form a clay/water slurry. After the slurry was smooth, calcium carbonate slurry, latex and calcium stearate were added in that order. The formulation contained 70% by weight solids and a pH 8-8.5.

To aliquots, usually 200 grams, of the above 70% base formulation, a solution of one of the retention aids to be evaluated plus additional water were added such that the desired concentration of retention aid, based on coating solids, was present and the final total solids content of the coating to be tested was 65.0%.

That is, the various retention aids were added to different portions of the above in an amount of 0.40% by weight solids based on the solids present in the paper coating formulation. Final coating solids was 65.0% of the total, the remaining being water.

The results of penetration time and viscosity of the various retention aids using the previously described test methods are shown in the following tables. Where variations occur, such as noted on the tables. In the tables, under the column "Prep.", I and II indicate which of the previous examples were followed for polymer preparation.

The coating composition used to collect the data reported in Table I is described immediately following Table I. The coating composition used to collect the data reported in Tables II, III and IV is described in Example III.

TABLE I

| Copolymer Monomer Component | | | | | | | | |
|---|---|---|---|---|---|---|---|---|
| Acrylic Acid (wt %) | Itaconic Acid (wt %) | Anion | pH | Mol. Wt. | Dosage (wt %) | Prep. | Penetration at 77° F. (sec) | Brookfield Visc. at 100 rpm at 77° F. (cps) |
| 95 | 5 | Na, NH4* | 7.7 | 350,000 | 0.40 | II | 19.3 | 1,536 |
| 95 | 5 | Na, NH4* | 4.0 | 280,000 | 0.40 | I | 18.9 | 2,984 |
| 95 | 5 | K | 4.0 | 280,000 | 0.40 | I | 15.3 | 1,904 |
| 95 | 5 | Na | 4.0 | 280,000 | 0.40 | I | 13.8 | 1,380 |
| 100 | 0 | H | 3.0 | 300,000 | 0.40 | I | 13.2 | >4,000 |
| Alginate[1] | — | Na | — | — | 0.40 | — | 12.8 | 1,540 |
| CMC[2] | — | Na | — | — | 0.40 | — | 10.8 | 1,748 |
| HEC[3] | — | — | — | — | 0.40 | — | 9.8 | 3,328 |
| Alkali swellable acrylic[4] | — | NH4 | 8.0 | 500,000 | 0.40 | — | 7.0 | 3,424 |
| Blank | — | — | — | — | 0 | — | 4.4 | 432 |

[1]Kelgin XL
[2]Hercules CMC-7M (carboxy methyl cellulose)
[3]QP-4400 (hydroxy ethyl cellulose)
[4]Alcogum L-31 (ethyl acrylate-methacrylic acid copolymer)
*Copolymer prepared from sodium acrylate and diammonium itaconate In Table I, total solids content of the paper coating with retention aid was 61% by weight solids. The components were, on a solids basis:

| Components | % by wt. |
|---|---|
| Clay (No. 2) | 51.3 |
| Carboxylated styrene-butadiene latex (Polysar 478) | 9.3 |
| Retention aid | 0.4 |
| Water | 39.0 |
| Total | 100.0 |

Table I demonstrates generally improved water retention of the coating composition with use of the acrylic acid-itaconic acid copolymer over the homopolymer (polyacrylic acid) and over Alcogum L-31, a different acrylic acid copolymer. Further, the use of polyacrylic acid and Alcogum L-31 results in considerable and undesirable viscosity increase of the acrylic coating composition compared with the use of the acrylic acid-itaconic acid copolymer.

TABLE II

| Copolymer Monomer Component | | | | | | | | |
|---|---|---|---|---|---|---|---|---|
| Acrylic Acid (wt %) | Itaconic Acid (wt %) | Anion | pH | Mol. Wt. | Dosage (wt %) | Prep. | Penetration at 110° F. (sec) | Brookfield Visc. at 100 rpm at 110° F. (cps) |
| Alginate[1] | — | Na | — | — | 0.40 | — | 29.8 | 2,280 |
| CMC[2] | — | Na | — | — | 0.40 | — | 26.1 | 2,348 |
| 95 | 5 | Na, NH4* | 7.7 | 350,000 | 0.40 | II | 21.6 | 3,124 |
| Blank | — | — | — | — | 0 | — | 5.6 | 380 |

[1]Kelgin XL
[2]Hercules CMC-7M (carboxy methyl cellulose)
*Copolymer prepared from sodium acrylate and diammonium itaconate

TABLE III

| Copolymer Monomer Component | | | | | | | | |
|---|---|---|---|---|---|---|---|---|
| Acrylic Acid (wt %) | Itaconic Acid (wt %) | Anion | pH | Mol. Wt. | Dosage (wt %) | Prep. | Penetration at 110° F. (sec) | Brookfield Visc. at 100 rpm at 110° F. (cps) |
| CMC[1] | — | Na | — | — | 0.10 | — | 9.9 | 732 |
| CMC[1] | — | Na | — | — | 0.20 | — | 11.2 | 1,188 |
| CMC[1] | — | Na | — | — | 0.40 | — | 14.5 | 2,032 |
| 95 | 5 | Na, NH4* | 7.7 | 350,000 | 0.10 | II | 5.0 | 1,800 |
| 95 | 5 | Na, NH4* | 7.7 | 350,000 | 0.20 | II | 8.4 | 1,692 |

TABLE III-continued

| Copolymer Monomer Component | | | | | | | | |
|---|---|---|---|---|---|---|---|---|
| Acrylic Acid (wt %) | Itaconic Acid (wt %) | Anion | pH | Mol. Wt. | Dosage (wt %) | Prep. | Penetration at 110° F. (sec) | Brookfield Visc. at 100 rpm at 110° F. (cps) |
| 95 | 5 | Na, NH₄* | 7.7 | 350,000 | 0.40 | II | 13.9 | 2,040 |
| Alginate[2] | — | Na | — | — | 0.10 | — | 7.2 | 676 |
| Alginate[2] | — | Na | — | — | 0.20 | — | 9.9 | 1,072 |
| Alginate[2] | — | Na | — | — | 0.40 | — | 13.6 | 2,056 |
| Blank | — | — | — | — | 0 | — | 5.8 | 424 |

[1]Hercules CMC-7M (carboxy methyl cellulose)
[2]Kelgin XL
*Copolymer prepared from sodium acrylate and diammonium itaconate

TABLE IV

| Copolymer Monomer Component | | | | | | | |
|---|---|---|---|---|---|---|---|
| Acrylic Acid (wt %) | Itaconic Acid (wt %) | Anion | pH | Mol. Wt. | Dosage (wt %) | Prep. | Penetration at 110° F. (sec) |
| 95 | 5 | Na, NH₄* | 7.7 | 350,000 | 0.10 | II | 5.0 |
| 95 | 5 | Na, NH₄* | 7.7 | 350,000 | 0.20 | II | 6.9 |
| 95 | 5 | Na, NH₄* | 7.7 | 350,000 | 0.40 | II | 13.9 |
| Alginate[1] | — | Na | — | — | 0.10 | — | 7.2 |
| Alginate[1] | — | Na | — | — | 0.20 | — | 9.9 |
| Alginate[1] | — | Na | — | — | 0.40 | — | 13.6 |
| Alkali swellable acrylic[2] | — | NH₄ | 8.0 | 500,000 | 0.10 | — | 4.0 |
| Alkali swellable acrylic[2] | — | NH₄ | 8.0 | 500,000 | 0.20 | — | 7.1 |
| Alkali swellable acrylic[2] | — | NH₄ | 8.0 | 500,000 | 0.40 | — | 5.9 |
| Blank | — | — | — | — | 0 | — | 6.4 |

[1]Kelgin XL
[2]Alcogum L-31 (ethyl acrylate-methacrylic acid copolymer)
*Copolymer prepared from sodium acrylate and diammonium itaconate While the invention has been described with reference to certain specific embodiments thereof, it is understood that it is not to be so limited since alterations and changes may be made herein which are within the full intended scope of the appended claims.

What is claimed is:

1. In a paper and paperboard coating composition containing pigment, binder, lubricant and water, the improvement comprising the presence of at least one copolymer of from about 80% to about 98% by weight of acrylic acid and (2) from about 2% to about 20% by weight of itaconic acid, said copolymer having a weight average molecular weight of between about 100,000 to about 800,000 being in the form of its free acid or partially or completely neutralized sodium, potassium, ammonium or mixed salt and being at least water dispersible, in amount sufficient to retard release of water from the coating composition without adversely affecting viscosity of the coating composition.

2. The composition of claim 1 wherein said copolymer has a weight average molecular weight of between about 250,000 to about 400,000.

3. The composition of claim 2 wherein the copolymer is present in an amount of from about 0.05% by weight to about 0.80% by weight as solids based upon the total solids content of said composition.

4. The composition of claim 3 in which said copolymer is a copolymer of about 95% by weight acrylic acid and about 5% by weight itaconic acid in the form of its free acid or partially or completely neutralized sodium, potassium, ammonium or mixed salt.

5. The composition of claim 3 in which said copolymer is a copolymer of about 90% by weight acrylic acid and about 10% by weight itaconic acid in the form of its free acid or partially or completely neutralized sodium, potassium, ammonium or mixed salt.

6. The composition of claim 3 in which said copolymer is a copolymer of about 80% by weight acrylic acid and about 20% by weight itaconic acid in the form of its free acid or partially or completely neutralized sodium, potassium, ammonium or mixed salt.

7. The composition of claim 3 in which said copolymer is a copolymer of about 98% by weight acrylic acid and about 2% by weight itaconic acid in the form of its free acid or partially or completely neutralized sodium, potassium, ammonium or mixed salt.

8. The composition of claim 3 in which said copolymer is a copolymer of about 95% by weight sodium acrylate and about 5% by weight diammonium itaconate, has a pH of about 8.0 and a weight average molecular weight of about 350,000.

* * * * *